(12) United States Patent
Bartl

(10) Patent No.: US 9,709,160 B2
(45) Date of Patent: Jul. 18, 2017

(54) HYDRAULIC SYSTEM FOR A DUAL-CLUTCH TRANSMISSION

(71) Applicant: AUDI AG, Ingolstadt (DE)

(72) Inventor: Florian Bartl, Bergheim (DE)

(73) Assignee: AUDI AG, Ingolstadt (DE)

( * ) Notice: Subject to any disclaimer, the term of this patent is extended or adjusted under 35 U.S.C. 154(b) by 198 days.

(21) Appl. No.: 14/772,277

(22) PCT Filed: Feb. 27, 2014

(86) PCT No.: PCT/EP2014/000520
§ 371 (c)(1),
(2) Date: Sep. 2, 2015

(87) PCT Pub. No.: WO2014/135257
PCT Pub. Date: Sep. 12, 2014

(65) Prior Publication Data
US 2016/0003347 A1    Jan. 7, 2016

(30) Foreign Application Priority Data

Mar. 6, 2013   (DE) .................. 10 2013 003 894

(51) Int. Cl.
*F16H 3/08*          (2006.01)
*F16H 61/26*         (2006.01)
(Continued)

(52) U.S. Cl.
CPC ....... *F16H 61/0025* (2013.01); *F16D 48/062* (2013.01); *F16D 48/066* (2013.01);
(Continued)

(58) Field of Classification Search
CPC ........................ F16H 2059/683; F16H 3/006
(Continued)

(56) References Cited

U.S. PATENT DOCUMENTS 7,849,986 B2 *  12/2010  Kitou .................. F15B 19/005
                                                                192/3.58
7,878,932 B2 *   2/2011  Martini ................. F16H 61/12
                                                                475/5
(Continued)

FOREIGN PATENT DOCUMENTS

CN        102192319      9/2011
DE     10 2006 014 756   4/2007
(Continued)

OTHER PUBLICATIONS

Chinese Search Report issued on May 6, 2016 with respect to counterpart Chinese patent application 201480012014.3.
(Continued)

*Primary Examiner* — Ha D Ho
(74) *Attorney, Agent, or Firm* — Henry M. Feiereisen LLC

(57) ABSTRACT

A dual-clutch transmission includes a hydraulic system for actuating hydraulic cylinders of the clutches and the shifting elements. The hydraulic system has a pressure accumulator providing an accumulated pressure in the hydraulic system, and control valves actuatable by a control unit and respectively arranged in pressure lines routed to the hydraulic cylinders of the clutches to adjust the hydraulic pressure applied to the clutches. Pressure sensors associated with the control unit detect the hydraulic pressure. The control unit activates a pressure reduction mode when detecting a long vehicle downtime, and the accumulated pressure can be reduced in the pressure reduction mode, in which the control unit continuously opens the control valve associated with one clutch. Additionally, the pressure sensor associated with the first clutch together with the control unit is integrated into a control circuit in which the first pressure sensor assumes the detection of the actual accumulated pressure value.

15 Claims, 3 Drawing Sheets

(51) Int. Cl.
*F16H 61/00* (2006.01)
*F16D 48/06* (2006.01)
*F16H 61/688* (2006.01)
*F16D 48/02* (2006.01)

(52) U.S. Cl.
CPC ... *F16H 61/688* (2013.01); *F16D 2048/0203* (2013.01); *F16D 2048/0281* (2013.01); *F16D 2048/0293* (2013.01); *F16D 2500/1024* (2013.01); *F16D 2500/3024* (2013.01); *F16D 2500/3111* (2013.01); *F16D 2500/3148* (2013.01); *F16D 2500/70406* (2013.01); *F16H 2061/0034* (2013.01)

(58) Field of Classification Search
USPC .............................. 74/330, 335; 477/156, 158
See application file for complete search history.

(56) References Cited

U.S. PATENT DOCUMENTS

| | | | | |
|---|---|---|---|---|
| 8,113,988 | B2 * | 2/2012 | Foster | B60K 6/365 |
| | | | | 477/125 |
| 9,618,112 | B2 * | 4/2017 | Yoshimura | F16H 61/12 |
| 2005/0143224 | A1 | 6/2005 | Aoki et al. | |
| 2009/0215584 | A1 | 8/2009 | Grethel et al. | |
| 2010/0004092 | A1 | 1/2010 | Glatthaar et al. | |
| 2012/0144946 | A1 | 6/2012 | Lundberg et al. | |
| 2012/0145503 | A1 | 6/2012 | Moorman et al. | |
| 2013/0284289 | A1 | 10/2013 | Block et al. | |

FOREIGN PATENT DOCUMENTS

| | | |
|---|---|---|
| DE | 10 2007 037 589 | 2/2009 |
| DE | 10 2007 056 767 | 11/2009 |
| DE | 10 2008 032 245 | 1/2010 |
| DE | 10 2010 011 305 | 9/2011 |
| DE | 10 2010 037 243 | 3/2012 |
| DE | 10 2010 042 189 | 4/2012 |
| DE | 10 2010 042 194 | 4/2012 |
| DE | 10 2011 120 392 | 6/2012 |
| DE | 10 2011 100 800 | 8/2012 |
| EP | 2 520 832 | 7/2012 |
| WO | WO 2008/055463 | 5/2008 |

OTHER PUBLICATIONS

Translation of Chinese Search Report issued on May 6, 2016 with respect to counterpart Chinese patent application 201480012014.3.
International Search Report issued by the European Patent Office in International Application PCT/EP2014/000520.

* cited by examiner

HYDRAULIC SYSTEM FOR A DUAL-CLUTCH TRANSMISSION

CROSS-REFERENCES TO RELATED APPLICATIONS

This application is the U.S. National Stage of International Application No. PCT/EP20141000520, filed Feb. 27, 2014, which designated the United States and has been published as International Publication No. WO 20141135257 and which claims the priority of German Patent Application, Serial No. 10 2013 003 894.4, filed Mar. 6, 2013, pursuant to 35 U.S.C. 119(a)-(d).

BACKGROUND OF THE INVENTION

The invention relates to a dual-clutch transmission for a vehicle and to a method for carrying out a pressure reduction mode in such a hydraulic system.

In a dual-clutch transmissions, fully automatic gear change is made possible by two sub-transmissions without tractive force interruption. Torque is transmitted via one of two clutches that connect the two sub-transmissions to the drive. This results in a gear change without tractive force interruption by closing one of the clutches, while at the same time the other opens.

The clutches and the shift elements for engaging the gears are typically hydraulically controlled. The hydraulic system required for this purpose operates in the driving mode at an accumulator pressure of, for example, in the order of 30 bar, which is provided by a pressure accumulator of the hydraulic system. Arranged in the pressure lines, routed to the hydraulic cylinders of both clutches and the gearshift elements, are control valves which are respectively electrically operated by a control unit. With the assistance of the control valves, hydraulic pressure applied to the first clutch and the second clutch can be adjusted. Associated to the control unit are moreover first and second pressure sensors which respectively monitor the hydraulic pressure applied to the first clutch and the second clutch. When, for example, the detected pressure sensor signals fail to correspond with the operating condition of the first/second clutch, the control unit is able to identify the presence of a faulty operation of the dual-clutch transmission.

In view of the very small gap dimensions of control valves in the hydraulics and as a result of the oil additives that are large in relation thereto, deposits can develop at the valve gaps, when the accumulator pressure is high and the vehicle is not in operation for an extended period (for example, overseas transport, vacation, etc.). These deposits adversely affect comfort/function. The complete emptying of the accumulator would be suitable as a countermeasure though.

For this reason, the pressure accumulator of the hydraulic system can be completely emptied, when detecting extended vehicle downtimes; This, however, is not sensible for energetic reasons. As an alternative, the accumulator pressure may be reduced to, for example, 10 bar. As a result, hydraulic oil deposits are prevented in the control valves, on the one hand. On the other hand, at least part of the stored pressure energy can still be used during pressure build-up for the next driving operation.

SUMMARY OF THE INVENTION

The object of the invention is to provide a dual-clutch transmission with a hydraulic system, in which the pressure reduction mode can be executed in a reliable manner in the absence of any additional sensor.

According to one aspect of the invention, the object is achieved by a dual-clutch transmission for a vehicle, including a hydraulic system for actuation of hydraulic cylinders of the clutches and the gearshift elements of the dual-clutch transmission, which hydraulic system includes a pressure accumulator for providing an accumulator pressure in the hydraulic system, wherein the pressure lines, routed to the hydraulic cylinders of the first clutch and the second clutch, have each disposed therein a control valve controllable by a control unit for adjusting the hydraulic pressure applied to the first and second clutches, with first and second pressure sensors being associated to the control unit for detecting the hydraulic pressure applied to the first and second clutches, and with the control unit activating a pressure reduction mode, when detecting an extended downtime of the vehicle, to allow reduction of the accumulator pressure, provided by the pressure accumulator, wherein the control unit continuously opens in the pressure reduction mode the control valve, associated to the first clutch, and wherein the pressure sensor, associated to the first clutch, is integrated together with the control unit in a control loop, in which the first pressure sensor assumes the detection of the actual accumulator pressure value.

According to another aspect of the invention, the object is achieved by a method for carrying out a pressure reduction mode in a hydraulic system of a dual-clutch transmission, as set forth above.

Preferred refinements of the invention are disclosed in the dependent claims.

The invention is based on the recognition that in the pressure reduction mode, as known in the art, the control unit adjusts a hydraulic control valve with a predetermined number of adjusting movements cyclically between the open and closed positions back and forth so as to cause pressure losses as a result of leakage and thus a reduced accumulator pressure. The number of adjusting movements of the hydraulic control valve is selected such that in any case the risk of oil deposits is eliminated, however, without having more detailed information about the actual accumulator pressure. Against this background, in accordance with the present invention, the control unit is integrated in the pressure reduction mode in a control loop, in which the first pressure sensor, detecting the hydraulic pressure to the first clutch, assumes the detection of the actual value of the accumulator pressure. The detection of the actual value of the accumulator pressure is thus carried out by the pressure sensor which is necessary anyway for safety reasons. There is thus no need for the provision of an additional pressure sensor in the region of the pressure accumulator, Which is desired in terms of component reduction. In the pressure reduction mode according to the invention, the control unit adjusts the control valve, associated with the first clutch, continuously or permanently to an open position. The first pressure sensor associated to the first clutch is therefore acted upon continuously by the accumulator pressure during the pressure reduction mode.

The first pressure sensor is fluidly disposed in the pressure line between the first control valve and the hydraulic cylinder of the first clutch. The second pressure sensor is fluidly disposed in the pressure line between the second control valve and the hydraulic cylinder of the second clutch.

It is of advantage, when the accumulator pressure reduction in the pressure reduction mode is implemented without additional pressure reducing components, such as a pressure release valve, but already existing components are used in a dual function in the pressure reduction mode. Therefore, the control valve, associated to the second clutch, can preferably be adjusted for pressure reduction cyclically between its open position and its closed position. In this way, as a result of hydraulic oil leakage, the adjusting movement causes pressure losses and hence the reduced accumulator pressure. The control unit can operate in the pressure reduction mode the control valve of the second clutch by means of an appropriate function, for example, a trapezoidal activation, in which the control valve of the second clutch is cyclically closed and opened, so that the accumulator is slowly emptied. In the above case, the control valve, associated to the second clutch, operates therefore as a control element of the control loop.

As an alternative, or in addition to the control valve of the second clutch, the control valves, associated to the gearshift elements, can be cyclically moved back and forth between the open and closed positions in order to realize a pressure drop as a result of hydraulic oil leakage. In terms of fine-tuning of the accumulator pressure to a reduced value, the sole use of the control valve, associated to the second clutch, is, however, of advantage.

The two pressure sensors, associated to the first and second clutches, meet in normal driving mode a safety function which involves a monitoring as to whether the first clutch or the second clutch is under no pressure or under pressure. Apart from the two pressure sensors that are anyway required for safety reasons, there is no need for the provision of an additional pressure sensor for detection of the actual value of the accumulator pressure, when carrying out the pressure reduction mode according to the invention. The pressure lines between the pressure accumulator and the control valves of the clutches as well as the gearshift elements are in terms of structures preferably free of further pressure sensors.

In normal driving mode, the accumulator pressure predefined by the pressure accumulator may be in the order of 30 bar. After implementation of the pressure reduction mode, the accumulator pressure may be reduced from this 30 bar to a range of 0 to 10 bar.

The pressure reduction mode can be activated on the basis of input parameters ascertained by the control unit. For example, the pressure reduction mode is activated, when the control unit detects that the vehicle has been shut down and the driver has left the vehicle. As an alternative, the pressure reduction mode can be activated by a factory-based actuation of a transport switch, specifically when a longer delivery period is involved.

The hydraulic system of the dual-clutch transmission can be divided into a clutch hydraulic circuit and a gear actuator hydraulic circuit, which are both acted upon by accumulator pressure from the pressure accumulator. The first and second clutches are hydraulically operated via the clutch hydraulic circuit. The shifting elements are operated hydraulically via the gear actuator hydraulic circuit. Preferably, the gear actuator hydraulic circuit is under no pressure in the pressure reduction mode, i.e. is shut down through appropriate positioning of the control valves.

The configurations and/or refinements of the invention, described above and/or set forth in the dependent claims, can—except, for example, in the cases of clear dependencies or incompatible alternatives—be used individually or be used in any combination with each other.

BRIEF DESCRIPTION OF THE DRAWING

The invention and its advantageous configurations and refinements as well as their advantages are explained in more detail with reference to drawings.

It is shown in.

DETAILED DESCRIPTION OF PREFERRED EMBODIMENTS

Figure 1:
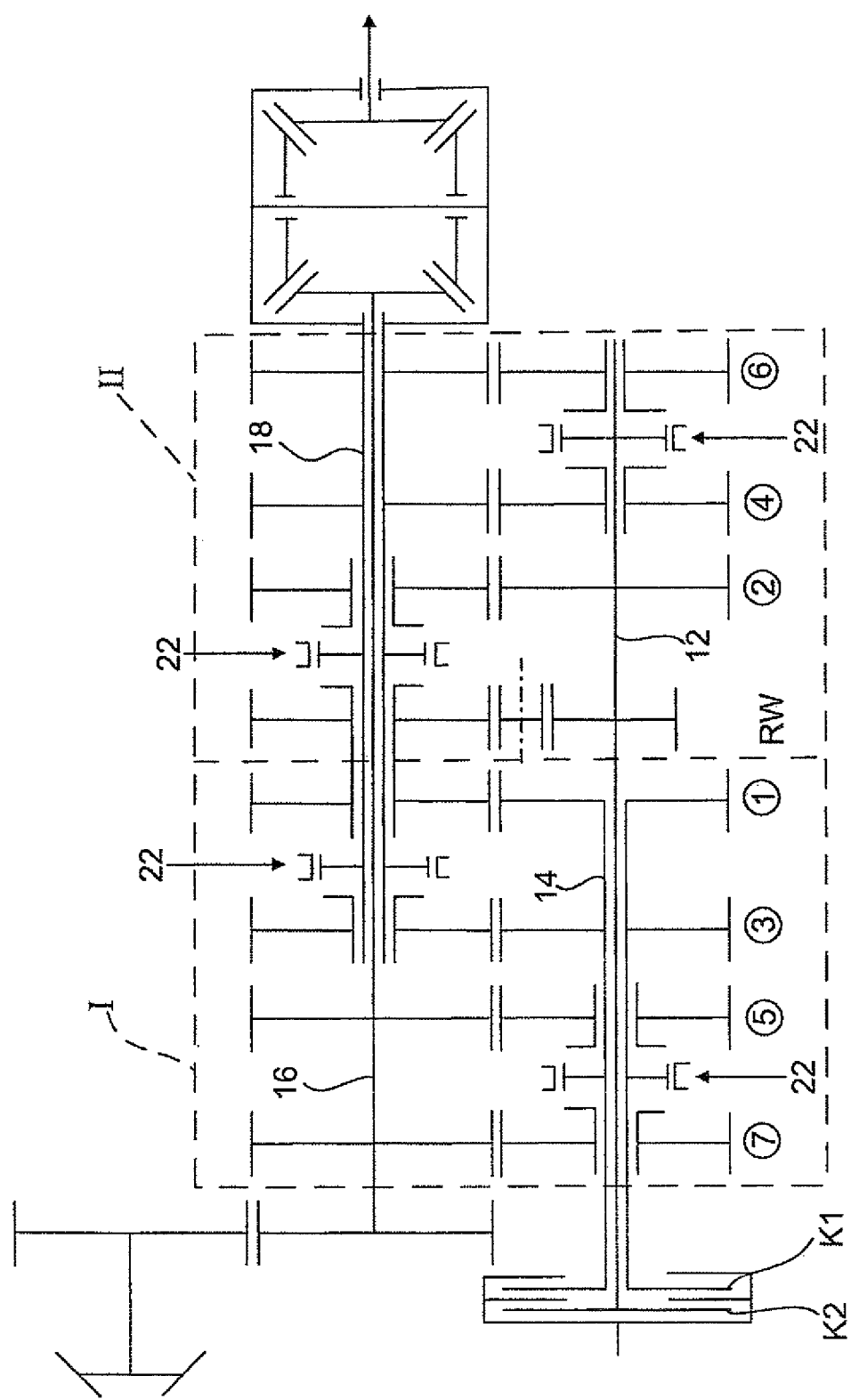
FIG. 1 a block diagram of a dual-clutch transmission for a motor vehicle with seven forward gears and one reverse gear.

FIG. 1 shows a block diagram of a dual-clutch transmission for a motor vehicle with all-wheel drive. The dual-clutch transmission has seven forward gears (see the circled numbers 1 to 7) as well as a reverse gear RW. The dual-clutch transmission is hereinafter described only insofar as it is necessary for the understanding of the invention. Thus, the dual-clutch transmission includes two input shafts 12, 14 arranged in coaxial relationship to one another and alternatingly connectable via two hydraulically-actuatable multi-disc clutches K1 and K2 to the drive source, for example an internal combustion engine (not shown). The input shaft 14 is configured as a hollow shaft, in which the input shaft 12, configured as a solid shaft, is guided. The input shafts 12, 14 drive via gear sets of the forward gears 1 to 7 and a reverse gear RW an output shaft 16 in axis-parallel arrangement and an intermediate shaft 18 formed as a hollow shaft. The gear sets of the forward gears 1 to 7 have each fixed gears and idler gears which are shiftable via shift elements 22. The shift elements 22 may, for example, be double synchronizer clutches which are able to respectively shift two adjacent idler gears from a neutral position. In contrast thereto, the shift element 22 shifting the third gear is, according to FIG. 1, a single clutch which couples only an idler gear on the intermediate shaft 18.

The sub-transmission I of the dual-clutch transmission has the gears for the odd forward gears 1, 3, 5 and 7 which are driven via the hollow input shaft 14. Associated to the sub-transmission II are the even forward gears 2, 4, 6 and the reverse gear RW, which are activatable via the clutch K2 and the input shaft 12, with the gears being shifted through respective closing of the corresponding shift elements 22.

Figure 2:
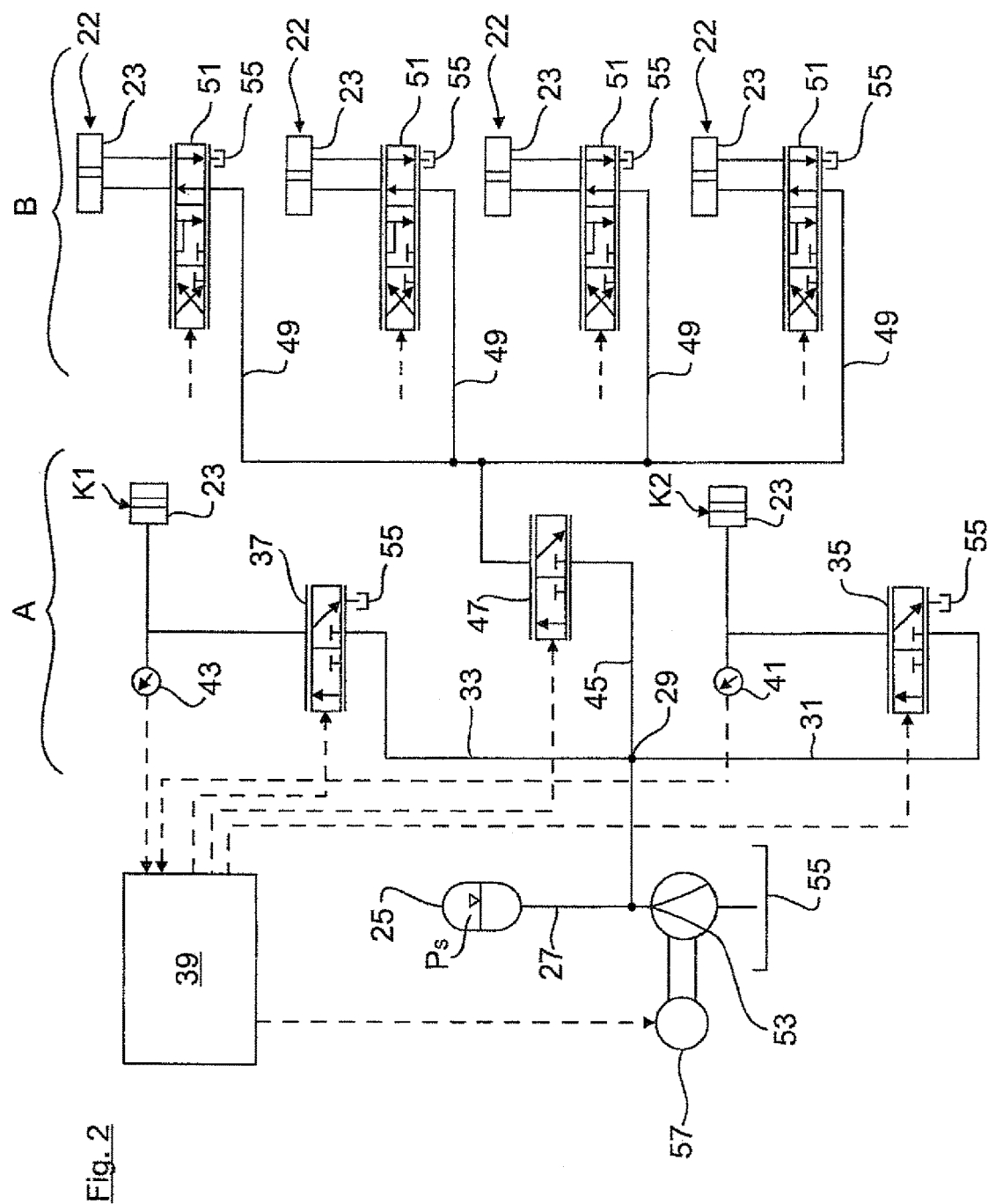
FIG. 2 the hydraulic system of the dual-clutch transmission of FIG. 1.

FIG. 2 shows the hydraulic system of the dual-clutch transmission by way of a simplified block diagram. With the assistance of the hydraulic system, the hydraulic cylinders 23 of the clutches K1, K2 and the shift elements 22 can be actuated. FIG. 2 shows a rough split of the hydraulic system into a clutch hydraulic circuit A and a gear actuator hydraulic circuit B. The two hydraulic circuits A, B are acted upon by the accumulator pressure from a pressure accumulator 25. For this purpose, a main line 27, connected to the pressure accumulator 25, is routed to a branch point 29 from which a first sub-line 31 is guided to the hydraulic cylinder 23 of the first clutch K1 and a second sub-line 33 is guided to the hydraulic cylinder 23 of the second clutch K2. Arranged in the two sub-lines 31, 33 are a first control valve 35 and a second control valve 37, respectively, which can be operated by a central control unit 39. In addition, the control unit 39 communicates by signal connection with a first pressure sensor 41 and a second pressure sensor 43. The pressure sensors 41, 43 detect the hydraulic pressure applied to the first clutch K1 and the second clutch K2, respectively.

Branching from the afore-mentioned branch point 29 and fluidly connected with the gear actuator hydraulic circuit B is a connection line 45, in which a further control valve 47 is provided. The connection line 45 divides downstream of the control valve 47 into a total of four sub-lines 49 which are routed via further control valves 51 to the hydraulic cylinders 23 of the shifting elements 22, respectively.

In addition, the hydraulic system includes a pressure pump 53 having an input side which is connected to an oil sump 55. The pressure pump 53 can be activated by the control unit 39 for charging the pressure accumulator via an electric motor 57.

Figure 3:
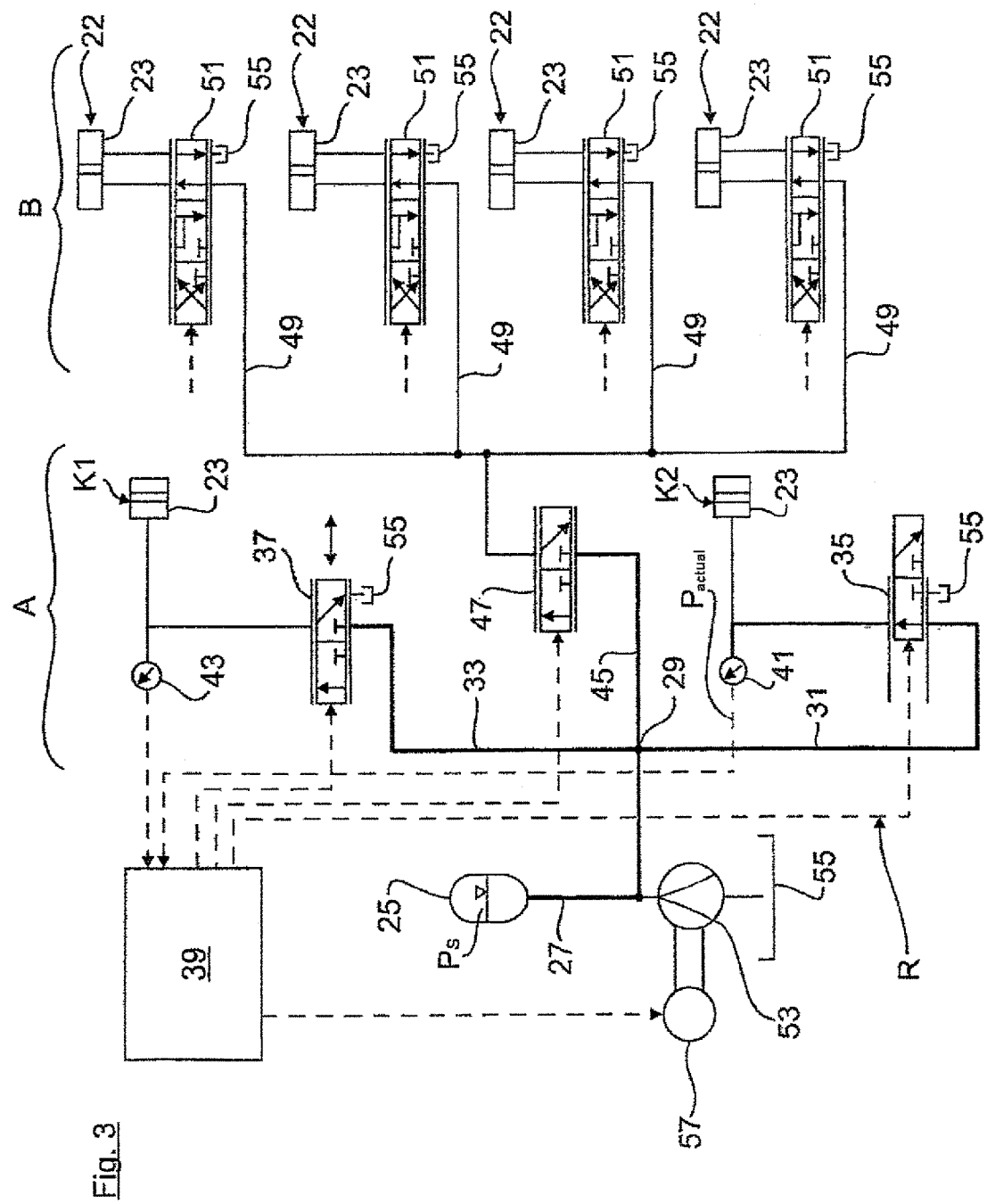
FIG. 3 a view corresponding to FIG. 2 to illustrate the pressure reduction mode.

According to FIG. 2 or 3, the hydraulic system has a clutch hydraulic circuit A, by which the clutches K1, K2 can be hydraulically operated, and a gear actuator hydraulic circuit B, by which the gearshift elements 22 can be hydraulically operated.

In the normal driving mode, the control unit 39 controls the control valves 35, 37, 47, 51 of the clutches K1, K2 and the gearshift elements 22 of the dual-clutch transmission to ensure a fully automatic gear change without tractive force interruption. The first and second pressure sensors 41,43, positioned in flow direction directly anteriorly of the hydraulic cylinders 23 of the clutches K1, K2, ascertain in the driving mode the hydraulic pressure applied to the clutches K1, K2. The accumulator pressure $p_s$, predefined by the pressure accumulator 25 in the driving mode, may lie, for example, in the order of 30 bar.

After a vehicle shutdown, the control unit 39 can ascertain input parameters that indicate an extended downtime of the vehicle. In this case, the control unit 39 activates a pressure reduction mode, in which the accumulator pressure $p_s$, provided by the pressure accumulator 25, is reduced.

In the pressure reduction mode, the pressure sensor 41, associated to the first clutch K1, is integrated together with the control unit 39 in a control loop R (FIG. 3), in which the first pressure sensor 41 assumes the detection of the actual accumulator pressure value $p_{actual}$. In addition, also the control valve 37 of the second clutch K2 is integrated in the control loop R, specifically as control element, which is adjusted cyclically between the open and closed positions so as to cause pressure losses as a result of leakage during adjusting movement and thus a reduced accumulator pressure $p_s$. Using the control loop R, the accumulator pressure $p_s$ is reduced from the afore-mentioned 30 bar to a desired value of 10 bar for example, as predefined by the control unit 39.

In order for the control valve 35, associated to the first clutch K1, to execute a reliable detection of the actual value, it is continuously in the open position in the pressure reduction mode (FIG. 3). Furthermore, the gear actuator hydraulic circuit B is permanently under no pressure in the pressure reduction mode, i.e. shut down.

The invention claimed is:

1. A dual-clutch transmission for a vehicle, comprising:
   first and second clutches;
   gearshift elements to shift between forward and reverse gears; and
   a hydraulic system configured to actuate hydraulic cylinders of the first and second clutches and the gearshift elements, said hydraulic system comprising:
   a pressure accumulator for providing an accumulator pressure in the hydraulic system,
   first pressure lines routed to the hydraulic cylinders of the first and second clutches,
   control valves disposed in the first pressure lines, respectively,
   a control unit operably connected to the control valves for adjusting a hydraulic pressure applied to the first and second clutches, said control unit being configured to activate a pressure reduction mode, when detecting an extended downtime of the vehicle, so as to reduce the accumulator pressure by continuously opening in the pressure reduction mode one of the control valves associated to one of the first and second clutches, and
   pressure sensors operably connected to the control unit for detecting the hydraulic pressure applied to the first and second clutches, with one of the pressure sensors, which is operably connected to the one of the first and second clutches, being integrated together with the control unit in a control loop, in which the one of the pressure sensors assumes in the pressure reduction mode a detection of an actual value of the accumulator pressure.

2. The dual-clutch transmission of claim 1, wherein the control unit is configured to adjust in the pressure reduction mode another one of the control valves of the other one of the first and second clutches cyclically between open and closed positions so as to cause a pressure loss as a result of leakage during adjusting movement and to thereby reduce the accumulator pressure.

3. The dual-clutch transmission of claim 1, wherein the hydraulic system includes a clutch hydraulic circuit, by which the first and second clutches are hydraulically operated, and a gear actuator hydraulic circuit, by which the gearshift elements are hydraulically operated.

4. The dual-clutch transmission of claim 3, wherein the gear actuator hydraulic circuit is under no pressure in the pressure reduction mode and thus shut down.

5. The dual-clutch transmission of claim 1, wherein the hydraulic system has second pressure lines which are fluidly connected to the first pressure lines and routed to the hydraulic cylinders of the gearshift elements, and further comprising control valves disposed in the second pressure lines, said first and second pressure lines being configured in the absence of a pressure sensor between the pressure accumulator and the control valves of the first and second clutches and the gearshift elements.

6. The dual-clutch transmission of claim 1, wherein in a normal driving mode, the pressure sensors are capable to ascertain the hydraulic pressure applied to the first and second clutches.

7. The dual-clutch transmission of claim 1, wherein in a normal driving mode, the pressure sensors ascertain whether the first and second clutches are under no pressure or are under pressure.

8. The dual-clutch transmission of claim 1, wherein the accumulator pressure is in a normal driving mode in the order of 30 bar, and reduced to 0 to 10 bar after implementation of the pressure reduction mode.

9. The dual-clutch transmission of claim 1, wherein the control unit is configured to activate the pressure reduction mode in one of two ways, a first way in which the control unit detects that the vehicle is shut down and a driver leaves the vehicle, a second way in which recognizes a factory-based actuation of a transport switch in the event of a longer delivery period.

10. A method for carrying out a pressure reduction mode in a hydraulic system of a dual-clutch transmission, said method comprising:
   determining by a control unit the presence of an extended downtime of a vehicle in response to ascertained input parameters; and
   activating a pressure reduction mode of the hydraulic system by continuously opening a control valve associated to one of first and second clutches of the dual-clutch transmission to thereby reduce an accumulator pressure in the hydraulic system, and by integrating a pressure sensor, operably connected to the control unit and provided to detect a hydraulic pressure applied to the first and second clutches, together with the control unit in a control loop, in which the pressure sensor detects an actual value of the accumulator pressure.

11. The method of claim 10, further comprising adjusting in the pressure reduction mode another control valve of the other one of the first and second clutches cyclically between open and closed positions so as to cause a pressure loss as a result of leakage during adjusting movement and to thereby reduce the accumulator pressure.

12. The method of claim 10, further comprising hydraulically operating the first and second clutches in a clutch hydraulic circuit of the hydraulic system, and hydraulically operating gearshift elements in a gear actuator hydraulic circuit, with the gear actuator hydraulic circuit being under no pressure in the pressure reduction mode and thus shut down.

13. The method of claim 12, further comprising providing the accumulator pressure by a pressure accumulator, wherein pressure lines between the pressure accumulator and the control valves of the first and second clutches and the gearshift elements are configured in the absence of a pressure sensor.

14. The method of claim 10, wherein the accumulator pressure is reduced from a pressure of 30 bar during normal driving mode to a pressure of 0 to 10 bar after activation of the pressure reduction mode.

15. The method of claim 10, wherein the control unit is configured to activate the pressure reduction mode in one of two ways, a first way in which the control unit detects that the vehicle is shut down and a driver leaves the vehicle, a second way in which recognizes a factory-based actuation of a transport switch in the event of a longer delivery period.

* * * * *